Sept. 20, 1932.   W. C. G. FICHTER   1,878,388
SLIP LINK FOR CONNECTING CROSS CHAINS TO SIDE CHAINS
Filed May 20, 1931
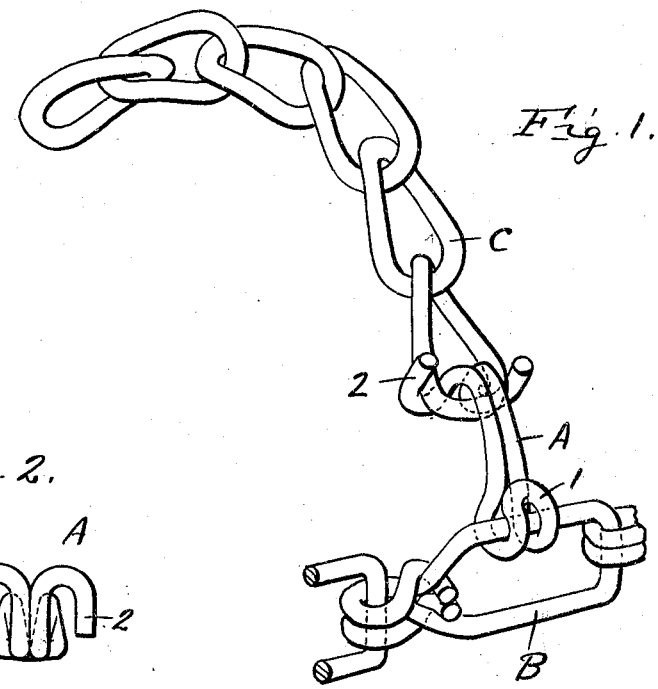
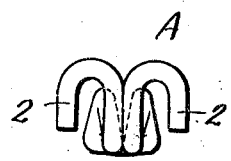
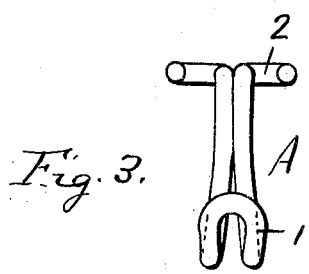
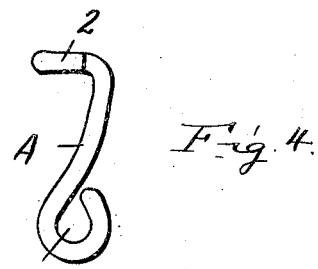
Inventor
*Walter C. G. Fichter*
By *Clarence A. O'Brien*
Attorney Patented Sept. 20, 1932

1,878,388

UNITED STATES PATENT OFFICE

WALTER C. G. FICHTER, OF WEST HAZLETON, PENNSYLVANIA

SLIP LINK FOR CONNECTING CROSS CHAINS TO SIDE CHAINS

Application filed May 20, 1931. Serial No. 538,825.

This invention relates to a slip link for connecting an end of the cross chain to a part of a side chain of an anti-skid device, the general object of the invention being to provide means whereby a cross chain when worn can be easily and quickly removed and replaced by a new one, with means whereby the link firmly connects the end of the cross chain with the side chain.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a perspective view showing parts of a side chain and a cross chain with the improved link connecting the two together.

Fig. 2 is a view looking toward the double hooked end of the link.

Fig. 3 is a top plan view of the link.

Fig. 4 is a side view thereof.

In these views, the letter A indicates the improved link and, as shown, said link is formed from a single piece of wire bent upon itself midway its ends with the two parts of the wire adjacent the bend slightly spaced apart and then this looped part is bent to form an eye 1 to receive a part of a link B of a side chain as shown in Fig. 1. The extremities of the two parts of the wire are bent into hooks 2 which extend outwardly from the body part of the link, each hook being of substantial U-shaped as shown. The body part or that portion of the link between the ends thereof is slightly arched or curved as shown, so as to properly position the hooks 2 relative to the eye carrying end of the link.

As shown in Fig. 1, the link is connected to a link of the side chain by bending the loop portion of the link over part of the chain to form the eye 1 through which a part of the link is passed. Thus the link is permanently connected with the link of the side chain.

The end link of the cross chain C is slipped over the double hooked end of the link A and then said link of the cross chain is adjusted so that a part of this will pass under the intermediate portion of the link A with parts of the cross chain link passing through the hooks 2 as clearly shown in Fig. 1.

Thus it will be seen that the cross chain link can be easily and quickly attached to the link or detached therefrom, and that the cross chain is firmly connected with the link A as it is impossible for the cross chain link to free itself from the link A due to the fact that a part of the cross chain link passes under the link A and other portions pass through the U-shaped hooks 2.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. A link of the class described comprising a body formed of a single piece of wire looped upon itself with the bent part turned to form an eye, with the extremities of the wire being bent outwardly to form U-shaped hooks, each hook extended at right angles to the body, and said hooks extending in opposite directions.

2. A link of the class described comprising a body formed of a single piece of wire looped upon itself with the bent part turned to form an eye, and the extremities of the wire being bent outwardly to form U-shaped hooks, each hook extended at right angles to the body, said hooks extending in opposite directions, the part between the bend and the hooks being slightly curved to position the bight portion of the hooks in substantially the same plane as the inner edge of the eye part.

In testimony whereof I affix my signature.

WALTER C. G. FICHTER.